US009253156B2

(12) United States Patent
Kashyap

(10) Patent No.: US 9,253,156 B2
(45) Date of Patent: Feb. 2, 2016

(54) DYNAMICALLY DEFINING NETWORK ACCESS RULES

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 13/157,199

(22) Filed: Jun. 9, 2011

(65) Prior Publication Data
US 2012/0317610 A1 Dec. 13, 2012

(51) Int. Cl.
H04L 12/00 (2006.01)
H04L 29/06 (2006.01)
H04L 12/54 (2013.01)
G06F 21/60 (2013.01)

(52) U.S. Cl.
CPC .......... *H04L 63/0263* (2013.01); *G06F 21/604* (2013.01); *H04L 12/5689* (2013.01); *H04L 29/06578* (2013.01); *H04L 29/06612* (2013.01)

(58) Field of Classification Search
CPC ............ H04L 12/5689; H04L 12/4641; H04L 12/5696; H04L 63/0263; G06F 21/604
USPC .......................................................... 726/1
See application file for complete search history.

(56) References Cited

U.S. PATENT DOCUMENTS

| 6,182,228 | B1* | 1/2001 | Boden et al. ............... 726/13 |
| 6,598,034 | B1 | 7/2003 | Kloth |
| 7,143,439 | B2 | 11/2006 | Cooper et al. |
| 7,209,962 | B2* | 4/2007 | Boden ............. H04L 63/0227 709/223 |
| 2003/0152035 | A1 | 8/2003 | Pettit et al. |
| 2003/0212657 | A1* | 11/2003 | Kaluskar et al. ............ 707/1 |
| 2004/0111640 | A1 | 6/2004 | Baum |
| 2007/0039044 | A1* | 2/2007 | Moonen .................... 726/13 |
| 2008/0163207 | A1* | 7/2008 | Reumann ......... H04L 63/0263 718/1 |
| 2008/0313729 | A1 | 12/2008 | Foschiano et al. |
| 2009/0063706 | A1 | 3/2009 | Goldman et al. |
| 2011/0299537 | A1* | 12/2011 | Saraiya ............. H04L 61/2596 370/392 |

OTHER PUBLICATIONS

U.S. Appl. No. 13/450,433, Office Action, Mailed: Jun. 24, 2014.

* cited by examiner

*Primary Examiner* — Jung Kim
*Assistant Examiner* — Thomas Ho
(74) *Attorney, Agent, or Firm* — Kunzler Law Group; Steven Bennett

(57) ABSTRACT

Systems and computer program products are provided for dynamically defining network access control rules. A placeholder for a parameter of an interface to an endpoint such as a data processing system or virtual machine may be provided in a network access control rule, instead of a static parameter. The parameter may be dynamically determined, by a firewall or a hypervisor for example, and the placeholder may be replaced with the dynamically determined parameter.

9 Claims, 4 Drawing Sheets

DYNAMICALLY DEFINING NETWORK ACCESS RULES

BACKGROUND

The present invention relates to systems and computer program products for defining network access control rules. A network access control rule may be used by a data processing system to filter packets sent to and received from an endpoint. For example, a firewall hosted on a network component may have one or more network access control rules that it uses to filter packets sent to or received from one or more data processing systems behind the firewall. As another example, a hypervisor may have one or more network access control rules that it uses to filter packets sent to or received from one or more logical or "virtual" machines under the hypervisor's control.

One or more network control rules often are defined for each individual endpoint. However, as more endpoints such as data processing systems and virtual machines are added to networks, data centers and cloud computing systems, more network access rules are required to filter packets sent to and received from these endpoints. Some systems may have hundreds or even thousands of endpoints. Accordingly, scalability becomes an issue as the cost of administration and management of network access control rules increases.

These issues may arise both in the context of a plurality of physical data processing systems behind a network control system such as a firewall, as well as in the context of a plurality of virtual machines. For example, one or more virtual machines may be hosted on a data processing system and may share the data processing system's resources. A hypervisor may control and/or manage these virtual machines. An administrator that wishes to impose a general policy that is applicable to each virtual machine may be required to define a separate network access control rule for each virtual machine. For example, an administrator may wish to define a separate rule for dropping egress packets from each virtual machine where the egress packets have source MAC addresses that does not match the virtual machine's MAC address (e.g., to prevent MAC address spoofing).

BRIEF SUMMARY

Systems and computer program products for defining network access control rules are provided herein. In a network access control rule, a placeholder may be provided for a parameter of an interface to an endpoint. A parameter of the interface to the endpoint may be dynamically determined, and the placeholder may be replaced with the determined parameter. In some embodiments, the endpoints may be data processing systems and the disclosed methods and computer programs may be implemented on a network component that may host a firewall. In other embodiments, the endpoints may be virtual machines, and the disclosed methods and computer programs may be implemented on a hypervisor.

DETAILED DESCRIPTION

Figure 1:
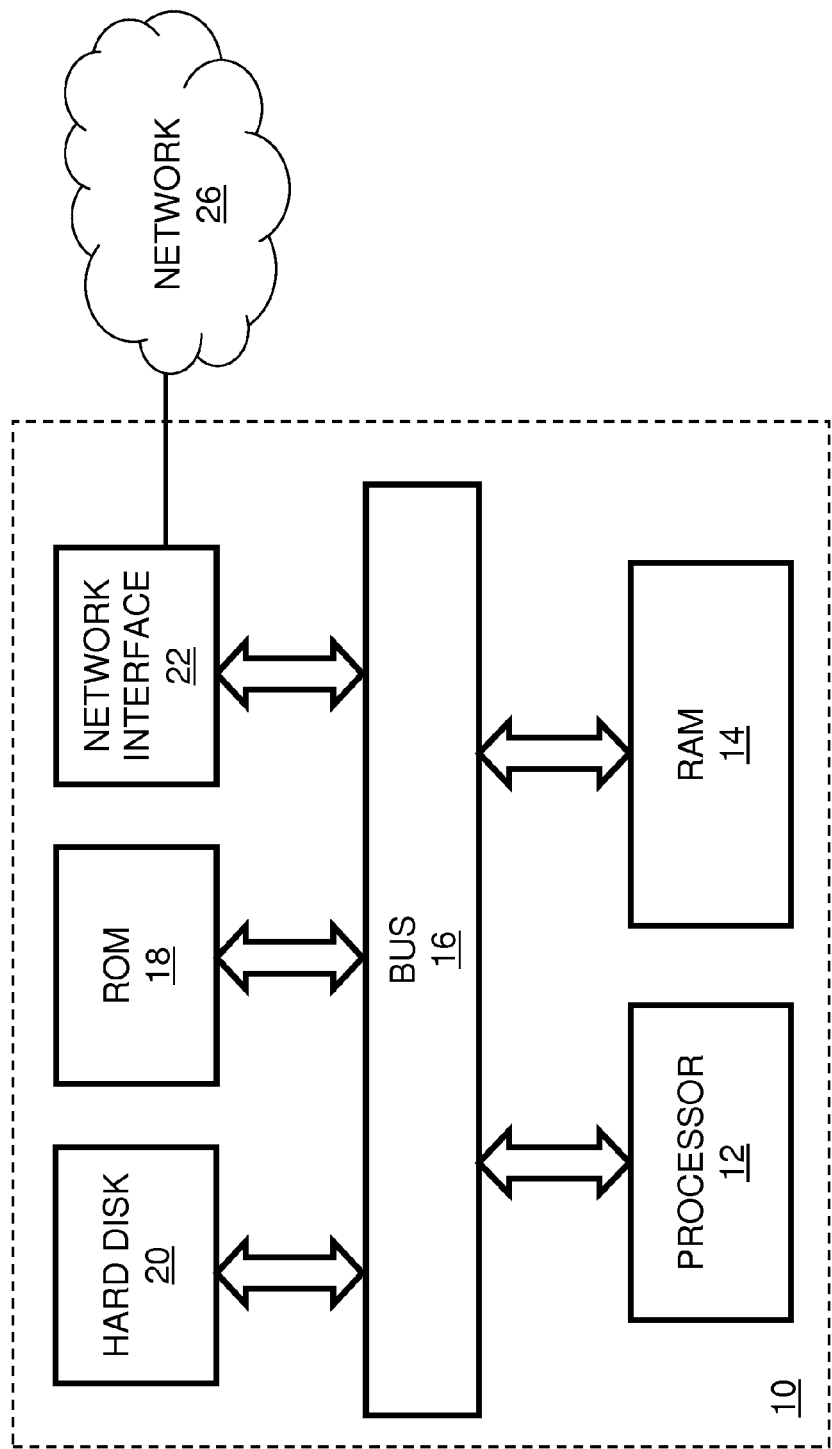
FIG. 1 depicts an exemplary data processing system upon which components, methods and computer programs described herein may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or cluster diagrams of methods, apparatus (systems) and computer program products according to embodiments of the invention. It will be understood that each cluster of the flowchart illustrations and/or cluster diagrams, and combinations of clusters in the flowchart illustrations and/or cluster diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or cluster diagram cluster or clusters.

These computer program instructions may also be stored in a computer readable medium that can direct computer, other programmable data processing apparatus, or other devices to function in a particular manner, such that the instructions stored in the computer readable medium produce an article of manufacture including instructions which implement the function/act specified in the flowchart and/or cluster diagram cluster or clusters.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or cluster diagram cluster or clusters.

Referring to FIG. 1, an exemplary data processing system 10 is depicted. Data processing system 10 may be a general or special purpose computer such as a personal computer, a laptop computer, a computer cluster (e.g., a blade system), a web server, a database server, a smart phone, a wireless email device, a tablet computer, a personal digital assistant, a network component (e.g., firewall, router, switch) and so forth. Data processing system 10 may include a processor 12 and memory (e.g., RAM 14) operably coupled by a bus 16. Data processing system 10 may include additional components, such as read-only memory (ROM) 18, long term storage (e.g., hard disk 20), and one or more communication interfaces such as network interface 22 through which a connection 24 may be established to communicate with other data processing systems on a network 26. Network interface 22 may be various types of network interfaces, such as an Ethernet card, a wireless adapter, and so forth.

Figure 2:
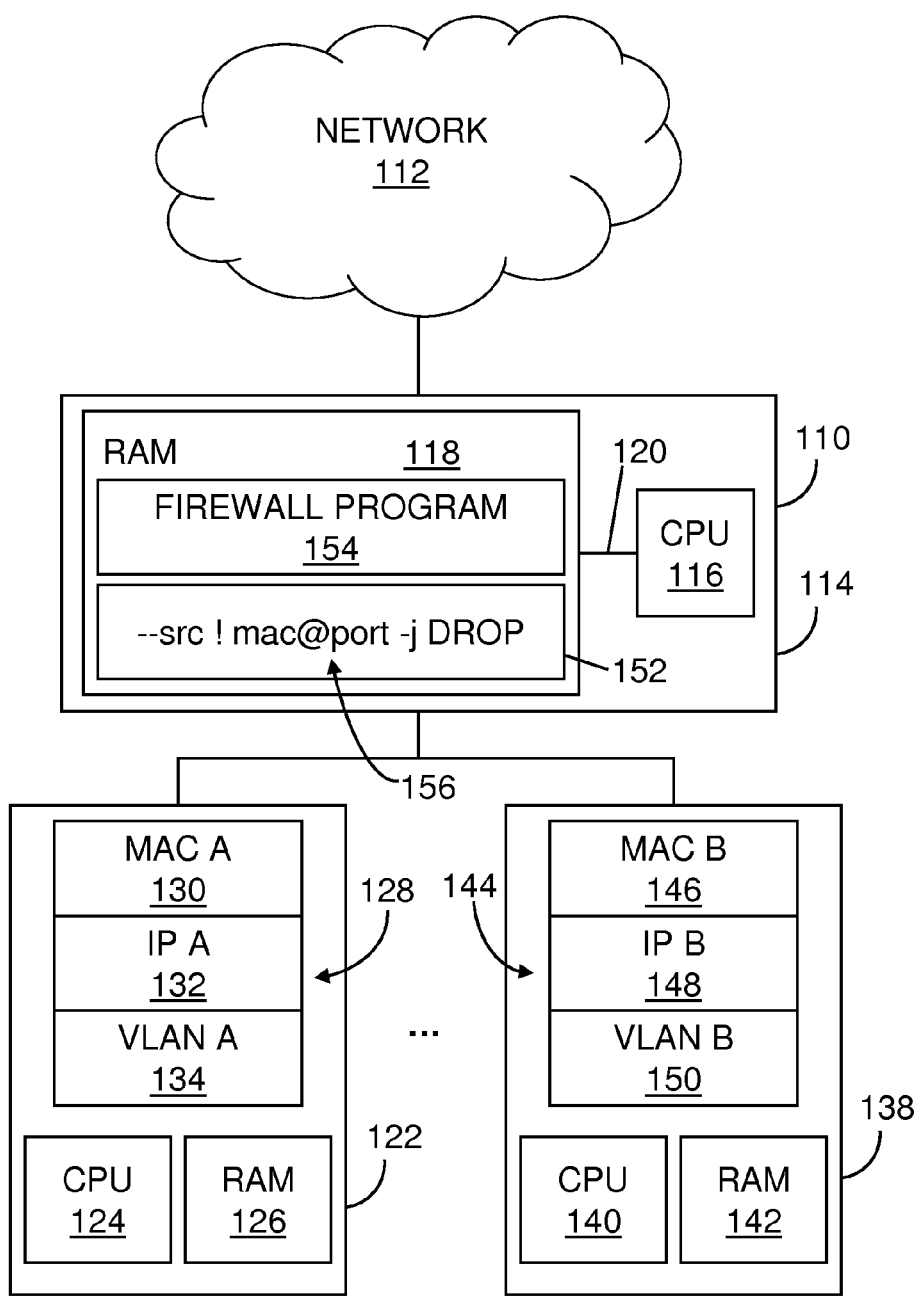
FIG. 2 depicts an exemplary data processing system configured to dynamically define a network access rule and filter packets sent to and received from two or more data processing systems.

An exemplary data processing system 110 (alternatively referred to as a "programmable data processing apparatus") for filtering packets sent to and received from one or more physical endpoints (i.e., data processing systems) from a network 112 is shown in FIG. 2 in the form of a network component 114. Network component 114 may be a router, a switch, a bridge, and so forth. Network component 114 includes a processor 116 operably coupled to a memory 118 by a bus 120. Although not depicted in FIG. 2, network component 114 may include other components found in a data processing system, such as those depicted in FIG. 1.

A first endpoint 122 connected to network component 114 may be any one of various types of data processing systems, and includes its own processor 124, memory 126, and a communication interface 128 (e.g., Ethernet adaptor, wireless interface) having a MAC address parameter 130 with a value of "MAC A," an IP address parameter 132 with a value of "IP A," and a VLAN parameter 134 with a value of "VLAN A."

Similar to first endpoint 122, a second endpoint 138 may be various types of data processing systems and includes a processor 140, memory 142, and a communication interface 144 (e.g., Ethernet adaptor, wireless interface). Similar to communication interface 128 of first endpoint 122, communication interface 144 of second endpoint 138 includes a MAC address parameter 146 with a value of "MAC B," an IP address parameter 148 with a value of "IP B," and a VLAN parameter 150 with a value of "VLAN B."

Network component 114 has stored in its memory 118 one or more network access control rules 152 and a firewall computer program 154 that includes instructions that are executed by processor 116 to filter packets sent to and received from one or more endpoints. In this manner, firewall computer program 154 controls network access to endpoints such as first endpoint 122 and second endpoint 138.

Network access control rule 152 may be defined by a user during configuration of firewall computer program 154. However, where a large number of endpoints are present, such as in a large network of data processing systems behind a firewall, it may be difficult to manage network access control rules for each endpoint by hand. This also may be true where endpoints repeatedly enter and leave a network behind a firewall, in each instance receiving different interface parameters (e.g., dynamic IP addresses assigned by a DHCP server).

Accordingly, instead of a user including a static interface parameter (e.g., an IP address) in a network access control rule, a user may provide a placeholder 156 (e.g., for a parameter of an endpoint interface in network access control rule 152. Placeholder 156 may be replaced with a parameter that is dynamically determined by firewall computer program 154. For example, firewall computer program 154 may include instructions that are executed by processor 116 to detect a parameter (e.g., MAC address parameters 130 or 146, IP address parameters 132 or 148, VLAN parameters 134 or 150) of an interface to an endpoint during runtime of firewall computer program 154 and replace placeholder 156 in network access control rule 152 with the detected parameter of the interface to the endpoint.

Figure 3:
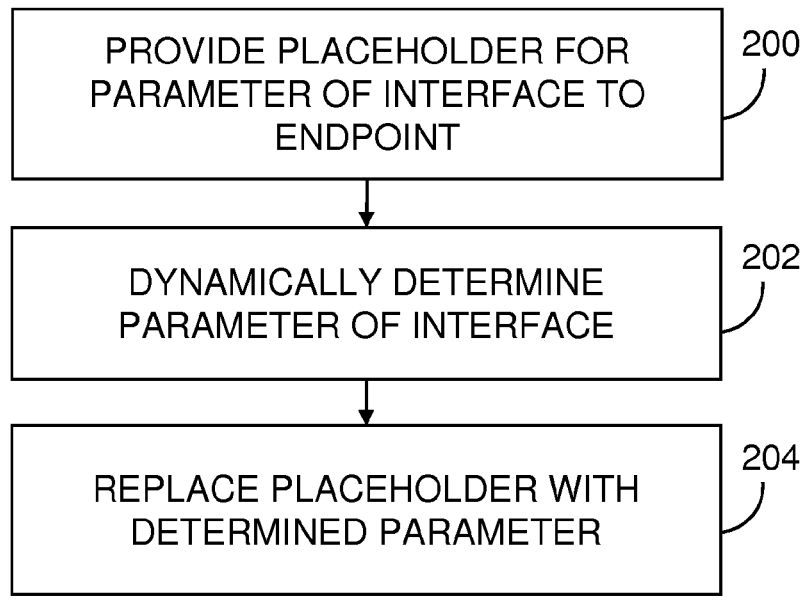
FIG. 3 depicts an exemplary method of dynamically defining a network access rule.

Referring now to FIG. 3, an exemplary method of dynamically defining a network access rule is depicted. Although the method is shown occurring in a particular order, this is not intended to be limiting, as the steps may be performed in other orders as well. At 200, a placeholder for a parameter of an interface to an endpoint is provided in a network access control rule. For example, a user may create a network access control rule that resembles a static network access control rule, except that instead of assigning a particular value to a parameter of an endpoint interface, the user may insert a placeholder that will be dynamically replaced with a parameter of the endpoint interface that is determined in another step.

At 202, a parameter of an interface to an endpoint is dynamically determined. As used herein, "dynamically determined" means that the parameter is automatically determined by a data processing system (e.g., network component 114) at some point in time independent of when the network access control rule is defined by the user, such as after the network access control rule is defined and/or during runtime of firewall computer program 154. A parameter of an interface to an endpoint also may be determined during configuration of a computer program such as a hypervisor, as will be discussed below. In any case, at 204, the placeholder in the network access rule is replaced with the determined parameter.

An example of how a network access control rule may be provided with a placeholder (200) may be understood with reference to FIG. 2. A network access control rule that typically might be defined for each endpoint behind a firewall is one that prevents the endpoint from using a false interface parameter (e.g., "spoofing" a MAC address). As an example, for an endpoint having a MAC address "a.b.c.d," a static rule could be defined as "--src ! a.b.c.d -j DROP." This rule indicates that any egress packet from the targeted endpoint that does not have a source equal to "a.b.c.d" should be dropped. However, such a rule would need to be redefined for each new endpoint and/or anytime a parameter of an interface to an endpoint changes, such as when a data processing system is assigned a new IP address by a DHCP server.

In the example in FIG. 2, network access control rule 152 is defined as "--src ! mac@port -j DROP." This rule includes the placeholder "mac@port," and indicates that any egress packets received from an endpoint at a particular interface (referred to generically by "port") with a source MAC address that is not equal to the MAC address of the interface to the endpoint should be dropped. As an example, assume that at 202 of FIG. 3, network component 114 dynamically determines that communication interface 128 of first endpoint 122 has a MAC address parameter 130 with a value of "MAC A." At 204 of FIG. 3, placeholder 156 ("mac@port") of network access control rule 152 is replaced with the value "MAC A." Thereafter, any egress packet sent from first endpoint 122 through network component 114 that has a source MAC address that is not equal to "MAC A" will be dropped.

Placeholder 156 may be defined in various ways, depending on the nomenclature of a network access control rule in which it is defined. For example, instead of "mac@port," which refers to a MAC address of a particular port, placeholder 156 could include a different parameter for the port, such as "IP@port" or "VLAN@port." Moreover, the second part of placeholder 156 may refer to different interfaces to different endpoints, such as "eth10," "tap11," and so a MAC address for a different interface may be defined, for example, with the placeholder "mac@eth10." In some cases, placeholder may be defined without a specific type of parameter (e.g., simply "@port"), and the type of parameter that should be used to replace the placeholder may be determined in the particular context in which the rule is being used. Although these examples utilize nomenclature commonly used with the Linux operating system, they should not be construed as limiting, and other nomenclatures also may be used.

A parameter of an interface to an endpoint may be determined (202) in various ways. For example, firewall computer program 154 in FIG. 2 may detect a MAC address parameter of an interface to an endpoint when the endpoint establishes an initial connection to network component 114, or by polling the endpoint at various intervals or in response to various events. Firewall computer program 154 may determine VLAN parameters of endpoints by interfacing with other network components (e.g. routers, switches, servers), by monitoring network traffic, and so forth.

Figure 4:
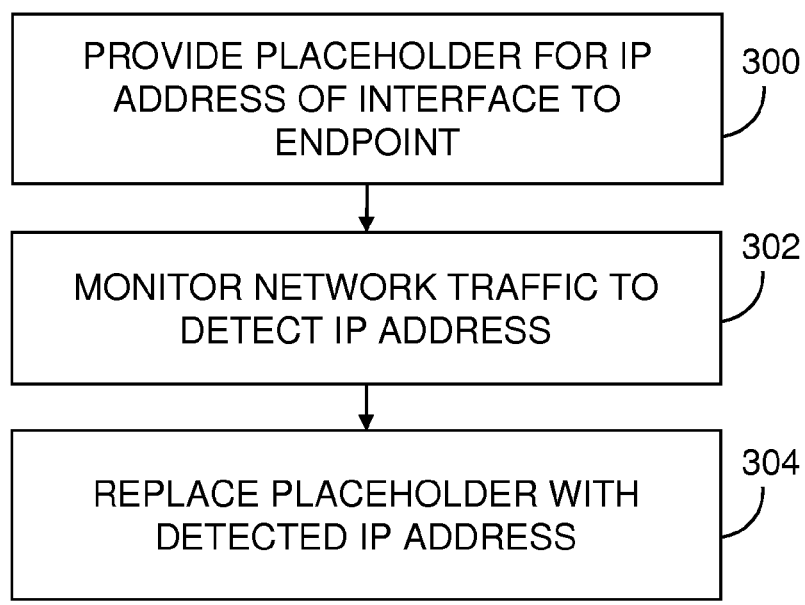
FIG. 4 depicts an exemplary method of dynamically defining a network access rule with a placeholder to be replaced by a detected IP address.

Firewall computer program 154 in FIG. 2 may determine an IP address parameter of an interface to an endpoint in various ways as well. FIG. 4 depicts a method similar to that shown in FIG. 3, except that the method of FIG. 4 is designed to dynamically define a network access control rule with a placeholder for an IP address of an interface to an endpoint. At 300, a placeholder for an IP address (e.g., "IP@port") is provided in a network access rule, similar to 200. At 302, network traffic is monitored to detect an IP address of an endpoint. Monitoring network traffic to detect IP addresses may be performed in various ways, such as by snooping DNS and/or DHCP traffic. At 304, similar to 204, the placeholder in the network access rule is replaced with the detected IP address.

In addition to monitoring network traffic (302), an IP address parameter of an interface to an endpoint may be determined by interfacing directly with other network components. For example, firewall computer program 154 may interface with a DHCP server to determine an IP address assigned to a communication interface of a particular endpoint. Alternatively, firewall computer program 154 may obtain the IP address directly from the endpoint when the endpoint establishes an initial connection to network component 114, or by polling the endpoint at various intervals or in response to various events.

Systems and methods disclosed herein are not limited to defining network access control rules for filtering packets sent to or received from one or more physical data processing systems. In some embodiments, network access rules may be defined for filtering packets sent to and received from one or more virtual machines.

Figure 5:
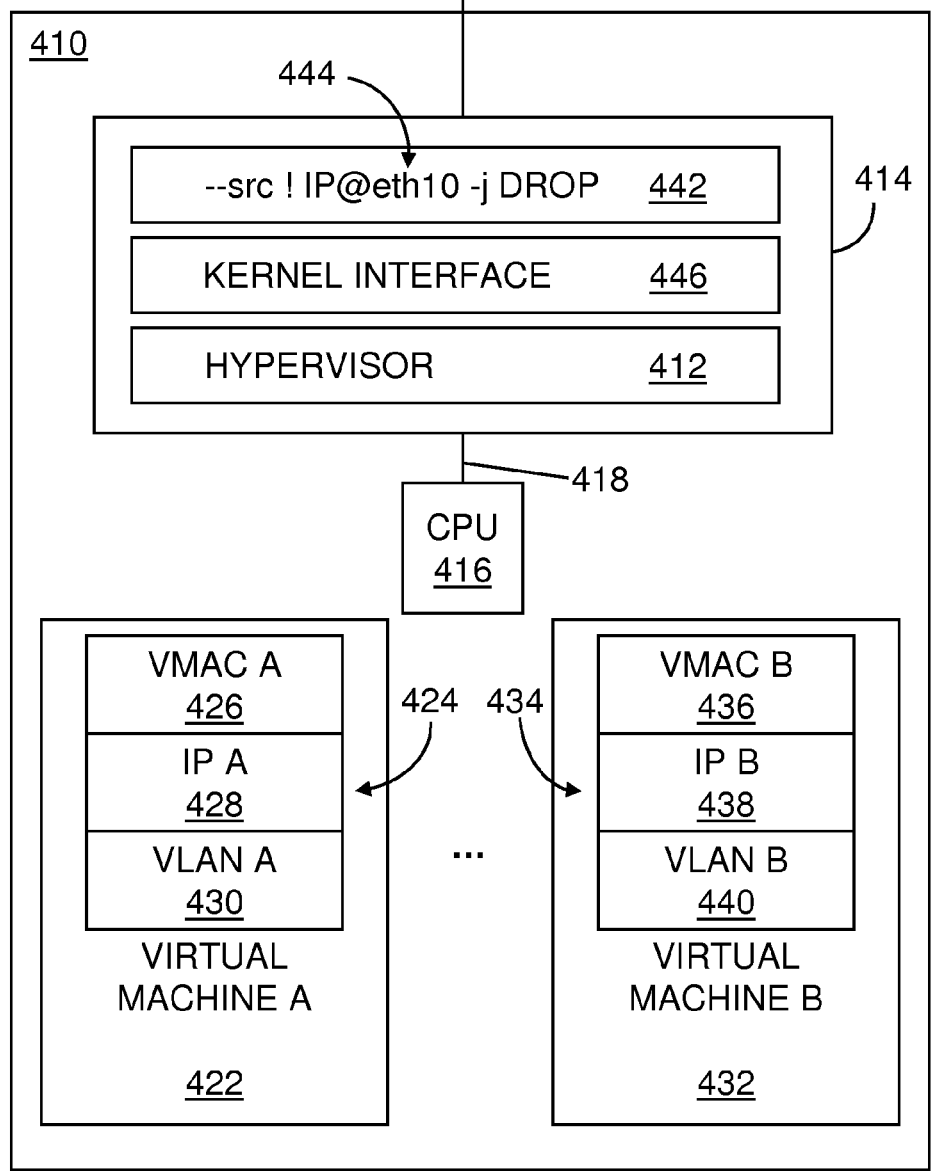
FIG. 5 depicts an exemplary data processing system configured to dynamically define a network access rule, and to filter packets sent to and received from two or more endpoints, where the data processing system is a hypervisor and the endpoints are virtual machines.

Referring now to FIG. 5, an exemplary data processing system 410 includes a hypervisor 412, which may be a computer program including instructions that are stored in memory 414 of data processing system 410 and that are executed by a processor 416 of data processing system 410. Processor 416 may be operably coupled to memory 414 and other data processing system components that are not shown in FIG. 5 via a bus 418. It should be understood that while not necessarily depicted in FIG. 5, data processing system 410 may include components typically found in data processing systems, such as those depicted in FIGS. 1 and 2. Similar to data processing system 110 in FIG. 2, data processing system 410 may be connected to a network 420.

Hypervisor 412 controls and/or manages one or more endpoints that take the form of virtual machines. Two virtual machines are depicted in FIG. 5 as being hosted on data processing system 410. However, this should not be construed as limiting, as a single data processing system may host any number of virtual machines. Additionally, a single hypervisor may control virtual machines hosted on multiple data processing systems.

A first virtual machine 422 (labeled "VIRTUAL MACHINE A") includes a logical communication interface 424 having a virtual MAC address parameter 426 with a value of "VMAC A," an IP address parameter 428 with a value of "IP A," and a VLAN parameter 430 with a value of "VLAN A." Similar to first virtual machine 422, a second virtual machine 432 (labeled "VIRTUAL MACHINE B") includes a logical communication interface 434 that has a virtual MAC address parameter 436 with a value of "VMAC B," an IP address parameter 438 with a value of "IP B," and a VLAN parameter 440 with a value of "VLAN B." Logical communication interfaces 424 and 434 are referred to as "logical," as opposed to the physical communication interfaces 128 and 144 of FIG. 2, because they are part of a virtual machine, rather than a physical network interface.

Similar to firewall computer program 154, hypervisor 412 uses one or more network access control rules 442 to filter packets sent to and received from virtual machines under its control. Using disclosed methods, such as the methods shown in FIGS. 3 and 4, a user may provide a placeholder 444 for a parameter of a logical interface to a virtual machine in network access control rule 442 (e.g., 200), rather than defining a static network access control rule. The parameter may be dynamically determined by hypervisor 412 (e.g., 202), and placeholder 444 may be replaced with the determined parameter (e.g., 204).

Hypervisor 412 may be configured to determine the parameter during configuration of a virtual machine and/or runtime of hypervisor 412. For example, in FIG. 5, network access control rule 442 is defined as "--src ! IP@eth10 -j DROP." Similar to network access control rule 152 of FIG. 2, network access control rule 442 of FIG. 5 is designed to prevent IP spoofing by requiring that any egress packet from the virtual machine at interface "eth10" be dropped where the source IP address of the packet is not equal to the IP address of the interface "eth0."

As an example of how placeholder 444 in network access control rule 442 may be replaced with a dynamically determined parameter, assume that, as shown in FIG. 5, logical communication interface 424 of first virtual machine 422 has been assigned an IP address of "IP A," and that first virtual machine 422 is logically connected to hypervisor 412 at the interface "eth10." Hypervisor 412 may dynamically determine the IP address of communication interface 424 of first virtual machine 422 by monitoring network traffic (302 of FIG. 3) or by interfacing with a network component such as a DHCP server. Once the IP address of communication interface 424 is determined, hypervisor 412 may replace placeholder 444 ("IP@eth10") with the determined IP address "IP A." Thereafter, any egress packets received at hypervisor 412 from first virtual machine 422 with a source IP address that is not equal to "IP A" will be dropped. Although examples described herein have referred to egress packets sent from an endpoint through a data processing system such as 110 or 410, it should be understood that network access control rules that control ingress traffic also may be provided with placeholders.

Unlike network element 114 in FIG. 2, which would not typically be in charge of assigning parameters to endpoint interfaces unless it also included a DHCP server, hypervisor 412 controls and/or manages virtual machines, and thus may assign parameters to communication interfaces of virtual machines. For example, during configuration of first virtual machine 422, hypervisor 412 may assign first virtual machine 422 the virtual MAC address parameter 426 value of "VMAC A." Based on this assignment, hypervisor 412 may determine that the virtual MAC address parameter 426 of first virtual machine 422 is "VMAC A" and replace a placeholder in an associated network access rule with the parameter "VMAC A."

A data processing system such as data processing system 110 of FIG. 2 or data processing system 410 of FIG. 5 may include a low level component for dynamically determining parameters of endpoints quickly and efficiently. For example, data processing system 410 in FIG. 5 includes a kernel interface 446 that is configured to determine parameters of interfaces to virtual machines. As noted above, kernel interface 446 may make this determination during configuration of a virtual machine and/or during runtime of the hypervisor. Determining parameters with kernel interface 446 may be faster and/or less resource intensive than with an application-level component.

The flowchart and cluster diagrams in the Figures illustrate the architecture, functionality, and operation of possible implementations of systems, methods and computer program products according to various embodiments of the present invention. In this regard, each cluster in the flowchart or cluster diagrams may represent a module, segment, or portion of code, which comprises one or more executable instructions for implementing the specified logical function(s). It should also be noted that, in some alternative implementations, the functions noted in the cluster may occur out of the order noted in the figures. For example, two clusters shown in succession may, in fact, be executed substantially concurrently, or the clusters may sometimes be executed in the reverse order, depending upon the functionality involved. It will also be noted that each cluster of the cluster diagrams and/or flowchart illustration, and combinations of clusters in the cluster diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or clusters thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for filtering packets sent to and received from a virtual machine, comprising:
   a processor;
   a memory;
   a bus operably coupling the processor and memory;
   a network access control rule stored in the memory, the network access control rule including a placeholder for an identifier for the virtual machine, the placeholder comprising a first parameter for a network address of the virtual machine and a second parameter for a network port of the virtual machine, the placeholder having the format "first_parameter@second_parameter"; and
   a hypervisor computer program including instructions stored in the memory that are executed by the processor to:
      determine the network address and the network port for the virtual machine during runtime of the hypervisor computer program, the hypervisor computer program determining the network address and the network port for the virtual machine by polling the virtual machine at predetermined intervals; and
      replace the placeholder with the determined network address and the determined network port during runtime of the hypervisor computer program, the "first_parameter" portion of the placeholder being replaced with the determined network address and the "second_parameter" portion of the placeholder being replaced with the determined network port.

2. The system of claim 1, further comprising a kernel interface for detecting the network address and the network port for the virtual machine during runtime.

3. The system of claim 1, wherein the network address and the network port for the virtual machine is one of a virtual MAC address, an IP address and a VLAN.

4. A computer program product for filtering network packets sent to and received from a virtual machine, comprising:
- a non-transitory computer readable storage medium having computer readable program code embodied therewith, the computer readable program code comprising:
  - computer readable program code configured to define a network access control rule, the network access control rule comprising a placeholder for an interface identifier for the virtual machine, the placeholder comprising a first parameter for a network address of the virtual machine and a second parameter for a network port of the virtual machine, the placeholder having the format "first_parameter@second_parameter";
  - computer readable program code configured to determine the network address and the network port for the virtual machine during runtime of a hypervisor computer program, the hypervisor computer program determining the network address and the network port for the virtual machine by polling the endpoint at predetermined intervals; and
  - computer readable program code configured to dynamically replace the first and second parameters of the placeholder in the network access control rule with the determined network address and the determined network port of the virtual machine during runtime of the hypervisor computer program, the "first_parameter" portion of the placeholder being replaced with the determined network address and the "second_parameter" portion of the placeholder being replaced with the determined network port.

5. The computer program product of claim 4, wherein the computer readable program code further comprises:
- computer readable program code configured to determine the network address and the network port for the virtual machine when a packet targeted at the virtual machine is received.

6. The computer program product of claim 4, wherein the network address for the virtual machine is one of a MAC address and a VLAN.

7. The computer program product of claim 4, wherein the network address for the virtual machine is an IP address.

8. The computer program product of claim 7, wherein the computer readable program code configured to determine the interface identifier for the virtual machine includes computer readable program code configured to monitor network traffic to detect the IP address.

9. The computer program product of claim 4, wherein the computer readable program code is configured to automatically determine, at a point in time after the definition of the network access control rule, the interface identifier for the virtual machine, the computer readable program code further configured to automatically determine at a kernel interface the interface identifier for the virtual machine.

* * * * *